United States Patent
Son et al.

(10) Patent No.: US 10,275,494 B2
(45) Date of Patent: Apr. 30, 2019

(54) ELECTRONIC DEVICE AND METHOD FOR PROVIDING DATA

(71) Applicant: Samsung Electronics Co., Ltd., Suwon-si, Gyeonggi-do (KR)

(72) Inventors: Hyeongrak Son, Suwon-si (KR); Jeonggwan Kang, Hwaseong-si (KR); Jongjin Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 299 days.

(21) Appl. No.: 15/231,031

(22) Filed: Aug. 8, 2016

(65) Prior Publication Data

US 2017/0046396 A1 Feb. 16, 2017

(30) Foreign Application Priority Data

Aug. 12, 2015 (KR) ........................ 10-2015-0113958

(51) Int. Cl.
*G06F 17/30* (2006.01)
(52) U.S. Cl.
CPC .... *G06F 17/30525* (2013.01); *G06F 17/3056* (2013.01); *G06F 17/30554* (2013.01); *G06F 17/30864* (2013.01)
(58) Field of Classification Search
CPC ........ G06Q 10/10; A61B 5/222; A61B 5/022; G06K 9/00389; H04N 21/2402; H04W 4/029; G06F 1/1626; G06F 17/30525; G06F 17/30554; G06F 17/3056; G06F 17/30864
See application file for complete search history.

(56) References Cited

U.S. PATENT DOCUMENTS

| 8,504,003 | B2 | 8/2013 | Chae et al. | |
|---|---|---|---|---|
| 2006/0020177 | A1* | 1/2006 | Seo | A61B 5/222 600/300 |
| 2010/0117959 | A1* | 5/2010 | Hong | G06F 1/1626 345/158 |
| 2011/0054799 | A1* | 3/2011 | Petrucelli | A61B 5/022 702/19 |
| 2012/0051605 | A1* | 3/2012 | Nagar | G06K 9/00389 382/124 |
| 2013/0095858 | A1* | 4/2013 | Lee | H04W 4/029 455/456.3 |
| 2014/0245150 | A1* | 8/2014 | Omernick | H04N 21/2402 715/719 |
| 2015/0170542 | A1* | 6/2015 | Contant | G06Q 10/10 434/236 |

FOREIGN PATENT DOCUMENTS

| JP | 2007-158811 A | 6/2007 |
|---|---|---|
| KR | 10-0496954 B1 | 6/2005 |
| KR | 10-2012-0071588 A | 7/2012 |

* cited by examiner

*Primary Examiner* — Etienne P Leroux
(74) *Attorney, Agent, or Firm* — Jefferson IP Law, LLP

(57) ABSTRACT

An electronic device, in which two or more users are registered, and a method thereof are provided. The method includes receiving an input, identifying an identifier of at least one user, from among the two or more registered users, corresponding to the received input, acquiring data associated with the identifier through at least one sensor functionally connected to the electronic device, and storing the identifier as at least part of the acquired data.

17 Claims, 10 Drawing Sheets

ELECTRONIC DEVICE AND METHOD FOR PROVIDING DATA

CROSS-REFERENCE TO RELATED APPLICATION(S)

This application claims the benefit under 35 U.S.C. § 119(a) of a Korean patent application filed on Aug. 12, 2015 in the Korean Intellectual Property Office and assigned Serial number 10-2015-0113958, the entire disclosure of which is hereby incorporated by reference.

TECHNICAL FIELD

The present disclosure relates to a method for providing data and an electronic device implementing the method.

BACKGROUND

A great variety of electronic devices, such as home appliances, mobile phones, smart phones, tablet personal computers (PCs), portable multimedia players (PMPs), audio/video equipment, desktop/laptop computers, car navigation devices, etc., that perform particular functions according to embedded programs have been widely used. Typically, such electronic devices may output stored information by means of sound and/or image.

Meanwhile, with the degree of integration of the electronic device increased and with high-speed, high-capacity wireless communication generalized, various functions have recently been installed in the electronic device. For example, the electronic device may have various types of sensors for collecting user's activity-related data (e.g., health information, location information, etc.), process sensing data into meaningful information for a user, and provide a variety of services using the processed data.

The electronic device may transmit sensing data, measured in a multi-user environment, to respective users using electronic devices. The electronic device may send data, even specialized to a specific user, to other users. This may, however, cause users to receive unnecessary data and to fail to obtain desired data. Further, even private data may be often sent to other users.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a data provision method for assigning identifiers to respective users using electronic devices and also provide an electronic device for supporting this method.

Another aspect of the present disclosure is to provide a data provision method for tagging an identifier, allocated to a login user, with acquired sensor-related data and also provide an electronic device for supporting this method.

Another aspect of the present disclosure is to provide a data provision method for displaying sensor-related data having a tagged identifier, being equal to an identifier allocated to a user who logs in through an application, and provide an electronic device for supporting this method.

In accordance with an aspect of the present disclosure, a method of an electronic device in which two or more users are registered is provided. The method includes receiving an input, identifying an identifier of at least one user, from among the two or more registered users, corresponding to the received input, acquiring data associated with the identifier through at least one sensor functionally connected to the electronic device, and storing the identifier as at least part of the acquired data.

In accordance with another aspect of the present disclosure, an electronic device is provided. The electronic device includes a sensor unit comprising at least one sensor and configured to obtain data associated with a user's activity through the at least one sensor, a memory, and a processor electrically connected to the memory. The processor is configured to receive an input, identify an identifier of at least one user, corresponding to the received input, from among two or more registered users, acquire data associated with the identifier through the at least one sensor functionally connected to the electronic device, and store the identifier as at least part of the acquired data.

In accordance with another aspect of the present disclosure, a non-transitory computer-readable storage medium having recorded thereon instructions comprising a program for executing a method of an electronic device in which two or more users are registered is provided. The method includes receiving an input, identifying an identifier of at least one user, from among the two or more registered users, corresponding to the received input, acquiring data associated with the identifier through at least one sensor functionally connected to the electronic device, and storing the identifier as at least part of the acquired data.

According to various embodiments of the present disclosure, the data provision method and the electronic device may identify a user in a multi-user environment and thus provide selectively data, collected depending on user activities, to each individual user.

According to various embodiments of the present disclosure, the data provision method and the electronic device may utilize specific data, specialized to a specific user, by distinguishing such specialized data from other user data in a multi-user environment.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
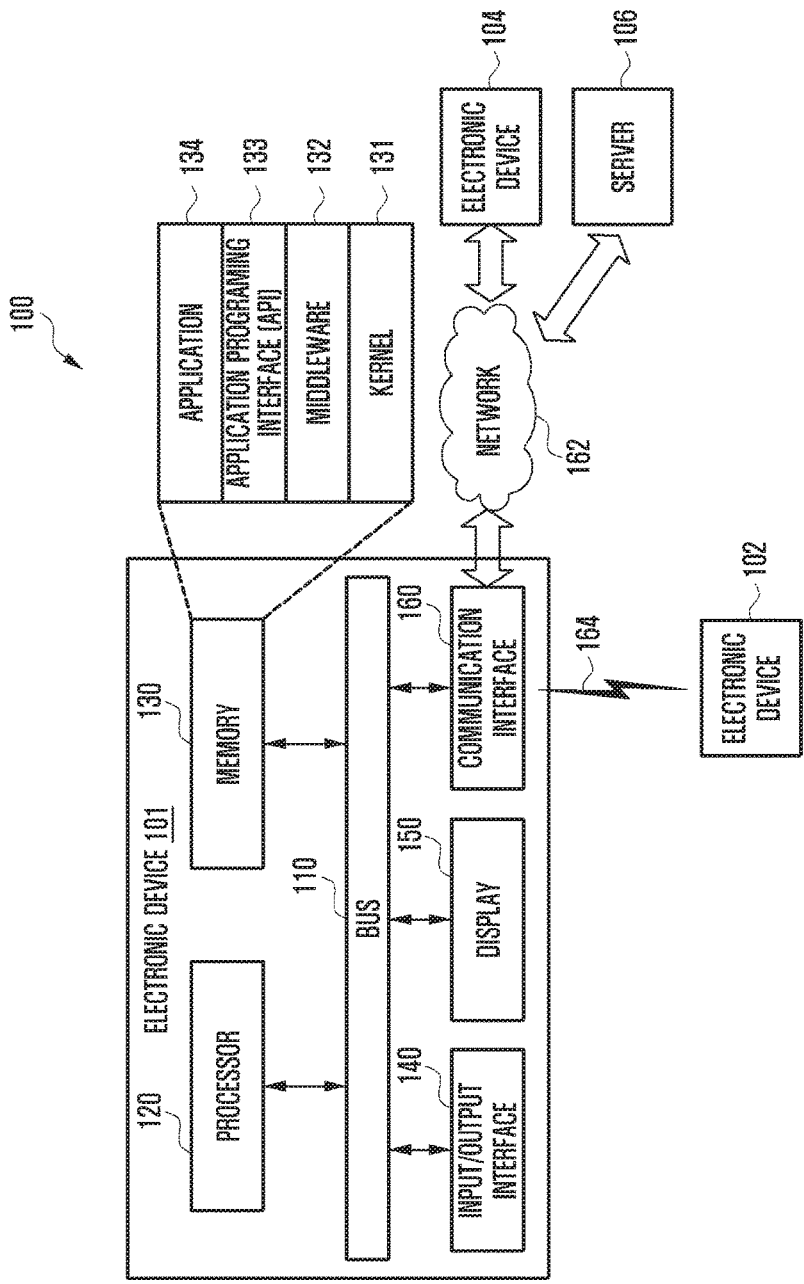
FIG. 1 is a diagram illustrating an electronic device in a network environment according to various embodiments of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the spirit and scope of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only, and not for the purpose of limiting the present disclosure as defined by the appended claims and their equivalents.

It is to be understood that the singular forms "a", "an", and "the", include plural referents unless the context clearly dictates otherwise. Thus, for example, reference to "a component surface" includes reference to one or more of such surfaces.

The expressions such as "include" and "may include" which may be used in the present disclosure denote the presence of the disclosed functions, operations, and constituent elements, and do not limit one or more additional functions, operations, and constituent elements. In the present disclosure, the terms such as "include" and/or "have", may be construed to denote a certain characteristic, number, operation, constituent element, component or a combination thereof, but should not be construed to exclude the existence of or a possibility of the addition of one or more other characteristics, numbers, operations, constituent elements, components or combinations thereof.

In the present disclosure, the expression "and/or" includes any and all combinations of the associated listed words. For example, the expression "A and/or B" may include A, may include B, or may include both A and B.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first user device and a second user device indicate different user devices, although both are user devices. For further example, a first element could be termed a second element, and similarly, a second element could also be termed a first element without departing from the scope of the present disclosure.

In the case where a component is referred to as being "connected" or "accessed" to another component, it should be understood that not only is the component connected or accessed to the other component, but also another component may exist between the component and the other component. In the case where a component is referred to as being "directly connected" or "directly accessed" to another component, it should be understood that there is no component therebetween.

Unless otherwise defined, all terms including technical and/or scientific terms used herein have the same meaning as commonly understood by one of ordinary skill in the art to which the present disclosure pertains. In addition, unless otherwise defined, all terms defined in generally used dictionaries may not be overly interpreted.

The electronic device corresponds to at least one of a smartphone, a tablet personal computer (PC), a mobile phone, a video phone, an e-book reader, a desktop PC, a laptop PC, a netbook computer, a personal digital assistant (PDA), a portable multimedia player (PMP), a digital audio player (e.g., Moving Picture Experts Group phase 1 or phase 2 (MPEG-1 or MPEG-2) audio layer 3 (MP3) player), a mobile medical device, a camera, or a wearable device. Examples of the wearable device include a head-mounted-device (HMD) (e.g., electronic eyeglasses), electronic clothing, an electronic bracelet, an electronic necklace, an appcessory, an electronic tattoo, a smart watch, and the like.

The electronic device according to various embodiments of the present disclosure may also be smart home appliances. Examples of the smart home appliances include a television (TV), a digital versatile disc (DVD) player, an audio system, a refrigerator, an air-conditioner, a cleaning device, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, an electronic album, or the like.

The electronic device according to various embodiments of the present disclosure may also include medical devices (e.g., magnetic resonance angiography (MRA), magnetic resonance imaging (MRI), computed tomography (CT), a scanning machine, an ultrasonic scanning device, and the like), a navigation device, a global positioning system (GPS) receiver, an event data recorder (EDR), a flight data recorder (FDR), a vehicle infotainment device, an electronic equipment for ships (e.g., navigation equipment, gyrocompass, and the like), avionics, a security device, a head unit for vehicles, an industrial or home robot, an automatic teller's machine (ATM), a point of sales (POS) system, and the like.

The electronic device according to various embodiments of the present disclosure may also include furniture or a portion of a building/structure, an electronic board, an electronic signature receiving device, a projector, various measuring instruments (e.g., a water meter, an electric meter, a gas meter and a wave meter) and the like. The electronic device according to various embodiments of the present disclosure may also include a combination of the devices listed above. In addition, the electronic device according to various embodiments of the present disclosure may be a flexible and/or contoured device. It should be obvious to those skilled in the art that the electronic device according to various embodiments of the present disclosure is not limited to the aforementioned devices.

Hereinafter, electronic devices according to various embodiments of the present disclosure will be described in detail with reference to the accompanying drawings. In the description, the term a 'user' may refer to a person or a device that uses or otherwise controls the electronic device, e.g., an artificial intelligent electronic device.

FIG. 1 illustrates a network environment including an electronic device according to an embodiment of the present disclosure.

Referring to FIG. 1, an electronic device 101 of a network environment 100 may include a bus 110, a processor 120, a memory 130, an input/output (I/O) interface 140, a display 150 and a communication interface 160.

The bus 110 may be a communication circuit that connects the components to each other and transfers data (e.g., control messages) between the components.

The processor 120 may receive instructions from the components (e.g., the memory 130, I/O interface 140, display 150 and communication interface 160) via the bus 110, decode the instructions and perform corresponding operations or data processing according to the decoded instructions.

The memory 130 may store instructions or data transferred from/created in the processor 120 or the other components (e.g., I/O interface 140, display 150 and communication interface 160). The memory 130 may include programming modules, e.g., a kernel 131, a middleware 132, an application programming interface (API) 133, and an application module 134. Each of the programming modules may be software, firmware, hardware or a combination thereof.

The kernel 131 may control or manage system resources (e.g., the bus 110, processor 120, and memory 130) used to execute operations or functions of the programming modules, e.g., the middleware 132, API 133, and application module 134. The kernel 131 may also provide an interface that can access and control/manage the components of the electronic device 101 via the middleware 132, API 133, and application module 134.

The middleware 132 may make it possible for the API 133 or application module 134 to perform data communication with the kernel 131. The middleware 132 may also perform control operations (e.g., scheduling and load balancing) for task requests transmitted from the application module 134 using, for example, a method for assigning the order of priority to use the system resources (e.g., the bus 110, processor 120, and memory 130) of the electronic device 101 to at least one of the applications of the application module 134.

The API 133 is an interface that allows the application module 134 to control functions of the kernel 131 or middleware 132. For example, the API 133 may include at least one interface or function (e.g., instruction) for file control, window control, character control, video process, and the like.

In various embodiments of the present disclosure, the application module 134 may include applications that are related to short message service (SMS)/multimedia messaging service (MMS), email, calendar, alarm, health care (e.g., an application for measuring blood sugar level, a workout application, and the like), and environment information (e.g., atmospheric pressure, humidity, temperature, and the like). The application module 134 may be an application related to exchanging information between the electronic device 101 and the external electronic devices (e.g., an electronic device 104). The information exchange-related application may include a notification relay application for transmitting specific information to an external electronic device or a device management application for managing external electronic devices.

For example, the notification relay application may include a function for transmitting notification information, created by the other applications of the electronic device 101 (e.g., SMS/MMS application, email application, health care application, environment information application, and the like), to an external electronic device (e.g., electronic device 104). In addition, the notification relay application may receive notification information from an external electronic device (e.g., electronic device 104) and provide it to the user. The device management application can manage (e.g., install, delete, or update) part of the functions of an external electronic device (e.g., electronic device 104) communicating with the electronic device 101, e.g., turning on/off the external electronic device, turning on/off part of the components of the external electronic device, adjusting the brightness or the display resolution of the display of the external electronic device, and the like, applications operated in the external electronic device, or services from the external electronic device, e.g., call service or messaging service, and the like.

In various embodiments of the present disclosure, the application module 134 may also include applications designated according to attributes (e.g., type of electronic device) of the external electronic device (e.g., electronic device 104). For example, if the external electronic device is an MP3 player, the application module 134 may include an application related to music playback. If the external electronic device is a mobile medical device, the application module 134 may include an application related to health care. In an embodiment of the present disclosure, the application module 134 may include an application designated in the electronic device 101 and applications transmitted from external electronic devices (e.g., server 106, electronic device 104, and the like).

The I/O interface 140 may receive instructions or data from the user via an I/O system (e.g., a sensor, keyboard or touch screen) and transfers them to the processor 120, memory 130 or communication interface 160 through the bus 110. For example, the I/O interface 140 may provide data corresponding to a user's touch input to a touch screen to the processor 120. The I/O interface 140 may receive instructions or data from the processor 120, memory 130 or communication interface 160 through the bus 110, and output them to an I/O system (e.g., a speaker or a display). For example, the I/O interface 140 may output voice data processed by the processor 120 to a speaker.

The display 150 may display information (e.g., multimedia data, text data, and the like) on a screen so that the user can view it.

The communication interface 160 may communicate between the electronic device 101 and an external system (e.g., an electronic device 104 or server 106). For example, the communication interface 160 may connect to a network 162 in a wireless or wired mode, and communicate with the external system. Wireless communication may include Wi-Fi, Bluetooth (BT), near field communication (NFC), GPS or cellular communication (e.g., long term evolution (LTE), LTE-advanced (LTE-A), code division multiple access (CDMA), wideband CDMA (WCDMA), universal mobile telecommunications system (UMTS), wireless broadband (Wi-Bro), global system for mobile communications (GSM), and the like). In addition, the wireless communication may include, for example, short range communication 164. Wired communication may include universal serial bus (USB), high definition multimedia interface (HDMI), recommended standard 232 (RS-232), plain old telephone service (POTS), and the like.

In an embodiment of the present disclosure, the network 162 may be a telecommunication network. The telecommunication network may include a computer network, Internet, Internet of things (IoT), telephone network, and the like. The protocol for communication between the electronic device 101 and the external system, e.g., transport layer protocol, data link layer protocol, or physical layer protocol, may be supported by at least one of the application module 134, API 133, middleware 132, kernel 131 and communication interface 160.

Figure 2:
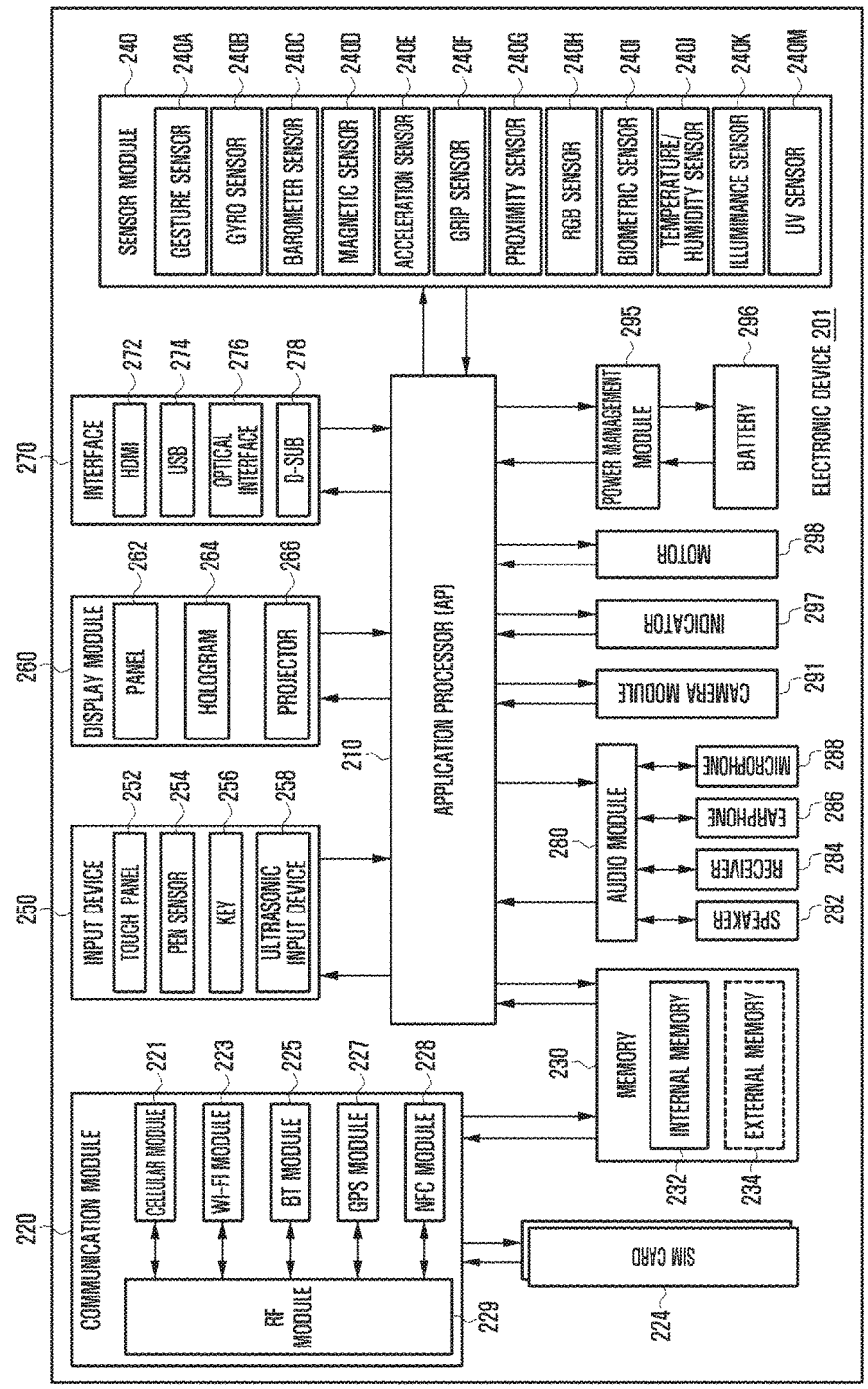
FIG. 2 is a block diagram illustrating an electronic device according to various embodiments of the present disclosure.

FIG. 2 illustrates a block diagram of an electronic device according to an embodiment of the present disclosure.

Referring to FIG. 2, an electronic device 201 may be all or part of the electronic device 101 as shown in FIG. 1, and may include one or more processors of an application processor (AP) 210, a communication module 220, a subscriber identification module (SIM) card 224, a memory 230, a sensor module 240, an input device 250, a display module 260, an interface 270, an audio module 280, a camera module 291, a power management module 295, a battery 296, an indicator 297, and a motor 298.

The AP 210 may control a number of hardware or software components connected thereto by executing the operation system or applications, process data including multimedia data, and perform corresponding operations. The AP 210 may be implemented with a system on chip (SoC). In an embodiment of the present disclosure, the AP 210 may further include a graphics processing unit (GPU).

The communication module 220 (e.g., communication interface 160) performs communication for data transmission/reception between the other electronic devices (e.g., an electronic device 102 or 104, and server 106) that are connected to the electronic device (e.g., electronic device 101) via the network. In an embodiment of the present disclosure, the communication module 220 may include a cellular module 221, a Wi-Fi module 223, a BT module 225, a GPS module 227, an NFC module 228 and a radio frequency (RF) module 229.

The cellular module 221 may provide voice call, video call, SMS or Internet service, and the like, via a communication network (e.g., LTE, LTE-A, CDMA, WCDMA, UMTS, Wi-Bro, GSM, and the like). The cellular module 221 may also perform identification or authentication for electronic devices in a communication network by using their SIM (e.g., SIM card 224). In an embodiment of the present disclosure, the cellular module 221 may perform part of the functions of the AP 210. For example, the cellular module 221 may perform part of the functions for controlling multimedia.

In an embodiment of the present disclosure, the cellular module 221 may include a communication processor (CP). The cellular module 221 may be implemented with, for example, an SoC. Although the embodiment of the present disclosure shown in FIG. 2 is implemented in such a way that the cellular module 221 (e.g., CP), the power management module 295, the memory 230, and the like, are separated from the AP 210, an embodiment can be modified in such a way that the AP 210 includes at least part of the listed elements or other elements of the device 201 (e.g., cellular module 221).

In an embodiment of the present disclosure, the AP 210 or the cellular module 221 (e.g., CP) may load instructions or data transmitted to and from at least one of a non-volatile memory or other components, on a volatile memory and then process them. The AP 210 or the cellular module 221 may also store data which is transmitted from/created in at least one of the components, in a non-volatile memory.

The Wi-Fi module 223, the BT module 225, the GPS module 227 and the NFC module 228 may include processors for processing transmission/reception of data, respectively. Although the embodiment of the present disclosure shown in FIG. 2 is implemented in such a way that the cellular module 221, Wi-Fi module 223, BT module 225, GPS module 227, and NFC module 228 are separated from each other, an embodiment can be modified in such a way that parts of the elements (e.g., two or more) are included in an integrated chip (IC) or an IC package. For example, part of the processors corresponding to the cellular module 221, Wi-Fi module 223, BT module 225, GPS module 227, and NFC module 228, e.g., a CP corresponding to the cellular module 221 and a Wi-Fi processor corresponding to the Wi-Fi 223, may be implemented with a SoC.

The RF module 229 may transmit or receive data, e.g., RF signals. The RF module 229 may include a transceiver, a power amplifier module (PAM), a frequency filter, a low noise amplifier (LNA), and the like. The RF module 229 may also include parts for transmitting/receiving electromagnetic waves, e.g., conductors, wires, and the like, via free space during wireless communication. Although the embodiment of the present disclosure shown in FIG. 2 is implemented in such a way that the cellular module 221, Wi-Fi module 223, BT module 225, GPS module 227, and NFC module 228 share the RF module 229, an embodiment can be modified in such a way that at least one of the elements transmit or receive RF signals via a separate RF module.

The SIM card 224 may be a card with a SIM. The SIM card 224 may be fitted into a slot of the electronic device. The SIM card 224 may include unique identification information, e.g., integrated circuit card identifier (ICCID), or subscriber information, e.g., international mobile subscriber identity (IMSI).

The memory 230 (e.g., memory 130) may include built-in or internal memory 232 and/or external memory 234. The internal memory 232 may include at least one of a volatile memory, e.g., dynamic random access memory (DRAM), static RAM (SRAM), synchronous dynamic RAM (SDRAM), and the like, non-volatile memory, e.g., one time programmable read only memory (OTPROM), programmable ROM (PROM), erasable and programmable ROM (EPROM), electrically erasable and programmable ROM (EEPROM), mask ROM, flash ROM, NAND flash memory, NOR flash memory, and the like.

In an embodiment of the present disclosure, the internal memory 232 may be a solid state drive (SSD). The external memory 234 may further include a flash drive, e.g., compact flash (CF), secure digital (SD), micro-SD, mini-SD, extreme digital (XD), a memory stick, and the like. The external memory 234 may be functionally connected to the electronic device via various types of interfaces. In an embodiment of the present disclosure, the electronic device 101 may further include storage devices or storage media such as hard drives.

The sensor module 240 may measure a physical quantity or sense operation states of the electronic device 201 and convert the measured or sensed data into electrical signals. The sensor module 240 may include at least one of a gesture sensor 240A, a gyro sensor 240B, an atmospheric pressure (barometer) sensor 240C, a magnetic sensor 240D, an acceleration sensor 240E, a grip sensor 240F, a proximity sensor 240G, a color sensor 240H (e.g., a red-green-blue (RGB) sensor), a biosensor (biometric sensor) 240I, a temperature/humidity sensor 240J, an illuminance sensor 240K, and an ultra-violet (UV) sensor 240M.

The sensor module 240 may also include an e-nose sensor, electromyography (EMG) sensor, an electroencephalogram (EEG) sensor, an electrocardiogram (ECG) sensor, an infrared (IR) sensor, a fingerprint sensor, an iris sensor, and the like. The sensor module 240 may further include a control circuit for controlling the one or more sensors.

The input device 250 may include a touch panel 252, a pen sensor 254 (i.e., a digital pen sensor), a key 256 and an ultrasonic input device 258. The touch panel 252 may sense touches using a capacitive sensing mode, a pressure sensing mode, an infrared sensing mode, and an ultrasonic sensing mode. The touch panel 252 may further include a control circuit. When the touch panel 252 is designed to operate in a capacitive sensing mode, the panel can also sense mechanical/physical touches or proximity of an object. The touch panel 252 may further include a tactile layer. In that case, the touch panel 252 can also provide tactile feedback to the user.

The pen sensor 254 (i.e., digital pen sensor) may be detected in a same or similar way as receiving a user's touch input or by using a separate recognition sheet. The key 256 may include mechanical buttons, optical keys or a key pad. The ultrasonic input device 258 is a device that can sense sounds via a microphone 288 of the electronic device 201 by using an input tool for generating ultrasonic signals, and then receiving and checking data associated with the signals. The ultrasonic input device 258 can sense signals in a wireless mode. In an embodiment of the present disclosure, the electronic device 201 may also receive a user's inputs from an external system (e.g., a computer or server) via the communication module 220.

The display module 260 (e.g., display 150) may include a panel 262, a hologram unit 264, or a projector 266. The panel 262 may be implemented with a liquid crystal display (LCD), active matrix organic light emitting diodes (AMO-LEDs), or the like. The panel 262 may be implemented in a flexible, transparent, impact-resistant, and/or wearable form. The panel 262 may form a single module with the touch panel 252. The hologram unit 264 shows a three-dimensional image in the air using interference of light. The projector 266 may display images by projecting light on a screen. The screen may be placed, for example, inside or outside of the electronic device 201. In an embodiment of the present disclosure, the display module 260 may further include a control circuit for controlling the panel 262, the hologram unit 264, or the projector 266.

The interface 270 may include a HDMI 272, a USB 274, an optical interface 276, a D-subminiature (D-sub) 278, and the like. The interface 270 may also be included in the communication interface 160 shown in FIG. 1. The interface 270 may also include a mobile high-definition link (MHL) interface, an SD card, a multi-media card (MMC) interface, an infrared data association (IrDA) standard interface, or the like.

The audio module 280 may provide conversions between audio and electrical signals. At least part of the components in the audio module 280 may be included in the I/O interface 140 shown in FIG. 1. The audio module 280 may process audio output from/input to, for example, a speaker 282, a receiver 284, earphones 286, the microphone 288, and the like.

The camera module 291 may take still images or moving images. In an embodiment of the present disclosure, the camera module 291 may include one or more image sensors (e.g., on the front side and/or the back side), a lens, an image signal processor (ISP), a flash (e.g., an LED or a xenon lamp), or the like.

The power management module 295 may manage electric power supplied to the electronic device 201. The power management module 295 may include a power management integrated circuit (PMIC), a charger IC, a battery or fuel gauge, and the like.

The PMIC may be implemented in the form of an IC chip or SoC. Charging electric power may be performed in wired and/or wireless modes. The charger IC may charge a battery, and prevent input over-voltage or input over-current to the battery from a charger. In an embodiment of the present disclosure, the charger IC may be implemented with a wired charging type and/or a wireless charging type. Examples of the wireless charging type of the charger IC are a magnetic resonance type, a magnetic induction type, an electromagnetic type, an acoustic type, and the like. If the charger IC is implemented with a wireless charging type, it may also include an additional circuit for wireless charging, e.g., a coil loop, a resonance circuit, a rectifier, and the like.

The battery gauge may measure a residual amount of the battery 296, a level of voltage, a level of current, a temperature during the charge, and the like. The battery 296 stores electric power and supplies it to the electronic device 201. The battery 296 may include a rechargeable battery or a solar battery.

The indicator 297 shows states of the electronic device 201 or of the parts thereof (e.g., the AP 210), e.g., a booting state, a message state, a recharging state, and the like. The motor 298 converts an electrical signal into a mechanical vibration. Although not shown, the electronic device 201 may include a processor for supporting a mobile TV, e.g., a GPU. The mobile TV supporting processor may process media data that complies with standards of digital multimedia broadcasting (DMB), digital video broadcasting (DVB), media flow, and the like.

Each of the elements/units of the electronic device according to the present disclosure may be implemented with one or more components, and may be called different names according to types of electronic devices. The electronic device according to the present disclosure may include at least one element described above. The electronic device may also be modified in such a way as to remove part of the elements or include new elements. In addition, the electronic device according to the present disclosure may also be modified in such a way that parts of the elements are integrated into one entity that performs their original functions.

In the present disclosure, the terminology 'module' refers to a 'unit' including hardware, software, firmware or a combination thereof. For example, the terminology 'module' is interchangeable with 'unit,' 'logic,' 'logical block,' 'component,' 'circuit,' and the like. A 'module' may be the least identifiable unit or part of an integrated component. A 'module' may also be the least unit or part thereof that can perform one or more functions of the module. A 'module' may be implemented through mechanical or electronic modes. For example, 'modules' according to various embodiments of the present disclosure may be implemented with at least one of an application specific integrated circuit (ASIC) chip, a field-programmable gate array (FPGAs) and a programmable-logic device that can perform functions that are known or will be developed.

An electronic device according to various embodiments of the present disclosure may also include a communication module including a BT module for communicating with external devices, a display module for displaying data of an external device selected from the external devices, and an AP for selecting an external device having transmitted data corresponding to a signal among data received from the external devices, wherein the AP transmits signals to the external devices, receives data for the signals from the external devices, selects one of the external devices based on the received data, and transmits an operation execution signal to the selected external device.

An electronic device according to various embodiments of the present disclosure may also include a communication module for communicating with the external devices, a display module for displaying data of an external device selected from the external devices, and an AP for selecting an external device having transmitted data corresponding to a signal among data received from the external devices, wherein the AP transmits signals to the external devices, receives data for the signals from the external devices, selects one of the external devices based on the received data, and transmits an operation execution signal to the selected external device.

An electronic device according to various embodiments of the present disclosure may also include a display module for displaying data received from an external device, a communication module for communicating with the electronic device or the external device, a sensor module for measuring a sensor value corresponding to a data request signal received from the electronic device, and an AP for selecting an external device to transmit data corresponding to a signal transmitted from the electronic device among the data received from the external device, wherein the AP receives the signal from the electronic device, transmits the data corresponding to the signal to the electronic device, receives an operation execution signal for the data from the electronic device, and performs at least one of various operations according to the operation execution signal.

Figure 3:
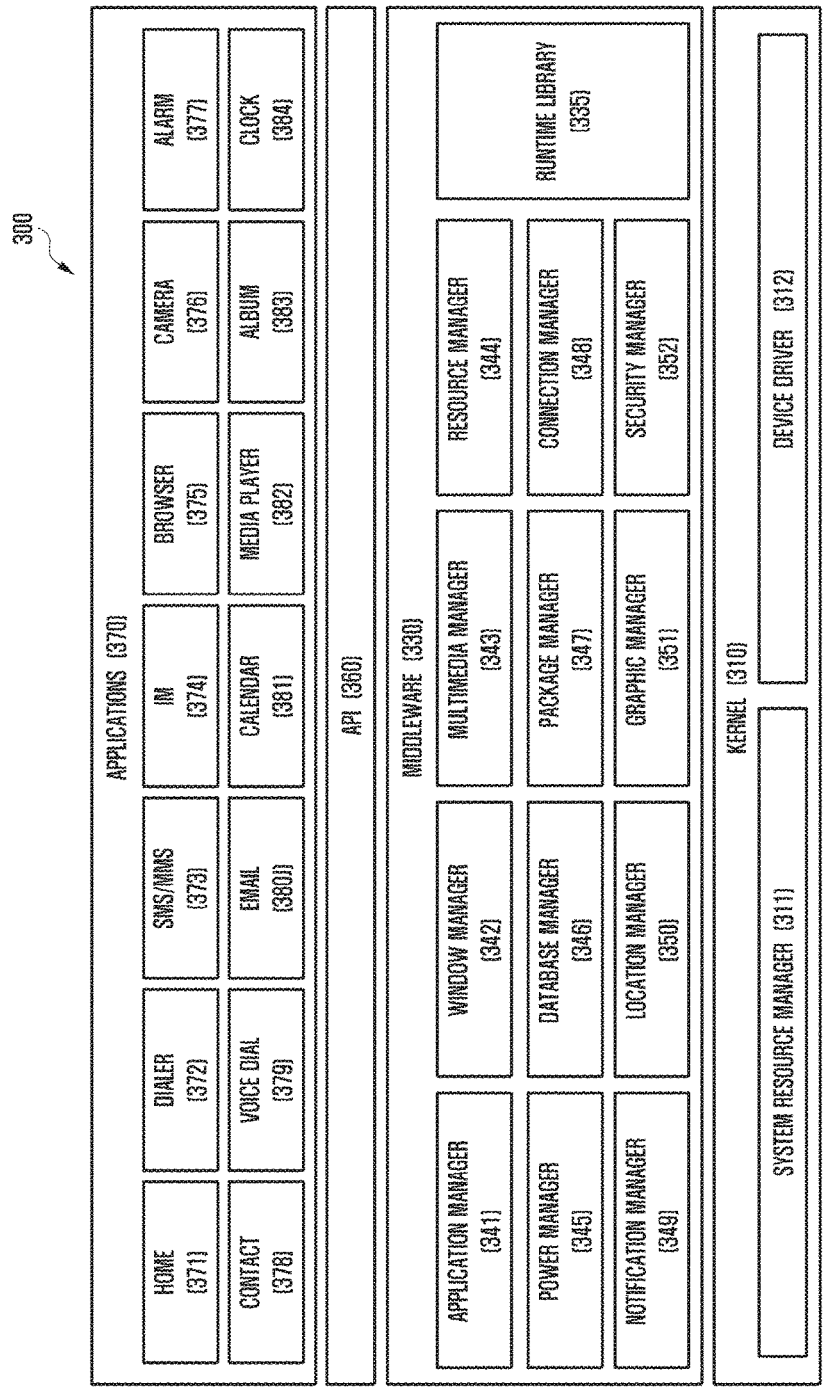
FIG. 3 is a block diagram illustrating a program module according to various embodiments of the present disclosure.

FIG. 3 is a block diagram of a program module according to various embodiments of the present disclosure.

Referring to FIG. 3, a program module 300 may include an OS for controlling resources related to the electronic device and/or various applications executed in the operating system. The OS may be, for example, Android, iOS, Windows, Symbian, Tizen, Bada, or the like.

The program module 300 includes a kernel 310, middleware 330, an API 360, and/or applications 370. At least some of the program module 300 may be preloaded on an electronic device, or may be downloaded from an external electronic device (e.g., the electronic device 102 or 104, or the server 106).

The kernel 310 may include, for example, a system resource manager 311 and/or a device driver 312. The system resource manager 311 may perform control, allocation, retrieval, or the like, of system resources. According to an embodiment, the system resource manager 311 may include a process manager, memory manager, file system manager, or the like. The device driver 312 may include, for example, a display driver, camera driver, BT driver, shared memory driver, USB driver, keypad driver, Wi-Fi driver, audio driver, or inter-process communication (IPC) driver.

The middleware 330 may provide a function required by the applications 370 in common, or provide various functions to the applications 370 through the API 360 so that the applications 370 can efficiently use limited system resources within the electronic device. According to an embodiment of the present disclosure, the middleware 330 may include, for example, at least one of a runtime library 335, an application manager 341, a window manager 342, a multimedia manager 343, a resource manager 344, a power manager 345, a database manager 346, a package manager 347, a connectivity (connection) manager 348, a notification manager 349, a location manager 350, a graphic manager 351, and a security manager 352.

The runtime library 335 may include a library module which a compiler uses in order to add a new function through a programming language while the applications 370 are being executed. The runtime library 335 may perform I/O management, memory management, functionality for an arithmetic function, or the like.

The application manager 341 may manage, for example, a life cycle of at least one of the applications 370. The window manager 342 may manage graphical user interface (GUI) resources used for the screen. The multimedia manager 343 may determine a format required to reproduce various media files, and may encode or decode a media file by using a coder/decoder (codec) appropriate for the corresponding format. The resource manager 344 may manage resources such as a source code, memory, and storage space of at least one of the applications 370.

The power manager 345 may operate together with a basic input/output system (BIOS) to manage a battery or other power, and may provide power information required for the operation of the electronic device. The database manager 346 may generate, search for, and/or change a database to be used by at least one of the applications 370. The package manager 347 may manage the installation or update of an application distributed in the form of a package file.

The connectivity manager 348 may manage a wireless connection such as, for example, Wi-Fi or BT. The notification manager 349 may display or notify of an event, such as an arrival message, appointment, proximity notification, and the like, in such a manner as not to disturb the user. The location manager 350 may manage location information of the electronic device. The graphic manager 351 may manage a graphic effect, which is to be provided to the user, or a user interface related to the graphic effect. The security manager 352 may provide various security functions required for system security, user authentication, and the like. According to an embodiment of the present disclosure, when the electronic device has a telephone call function, the middleware 330 may further include a telephony manager for managing a voice call function or a video call function of the electronic device.

The middleware 330 may include a middleware module that forms a combination of various functions of the above-described elements. The middleware 330 may provide a module specialized for each type of OS in order to provide a differentiated function. Also, the middleware 330 may dynamically delete some of the existing elements, or may add new elements as required.

The API 360 is, for example, a set of API programming functions, and may be provided with a different configuration according to an OS. For example, in the case of Android or iOS, one API set may be provided for each platform. In the case of Tizen, two or more API sets may be provided for each platform.

The applications 370 may include, for example, one or more applications which can provide functions such as home 371, dialer 372, SMS/MMS 373, instant message (IM) 374, browser 375, camera 376, alarm 377, contacts 378, voice dialer 379, email 380, calendar 381, media player 382, album 383, clock 384, health care (e.g., measure exercise quantity or blood sugar), or environment information (e.g., atmospheric pressure, humidity, or temperature information).

According to an embodiment of the present disclosure, the applications 370 may include an application (hereinafter, referred to as an "information exchange application" for convenience of the description) supporting information exchange between the electronic device and an external electronic device (e.g., the electronic device 102 or 104). The information exchange application may include, for example, a notification relay application for transferring specific information to an external electronic device or a device management application for managing an external electronic device.

For example, the notification relay application may include a function of transferring, to the external electronic device (e.g., the electronic device 102 or 104), notification information generated from other applications of the electronic device 101 (e.g., an SMS/MMS application, e-mail application, health management application, or environmental information application). Further, the notification relay application may receive notification information from, for example, an external electronic device and provide the received notification information to a user.

The device management application may manage (e.g., install, delete, or update), for example, at least one function of an external electronic device (e.g., the electronic device 102 or 104) communicating with the electronic device (e.g., a function of turning on/off the external electronic device or some components thereof, or a function of adjusting luminance or a resolution of the display), applications operating in the external electronic device, or services provided by the external electronic device (e.g., a call service and a message service).

According to an embodiment of the present disclosure, the applications 370 may include an application (e.g., a health care application of a mobile medical device or the like) designated according to an attribute of the external electronic device (e.g., the electronic device 102 or 104). According to an embodiment, the applications 370 may include an application received from the external electronic device (e.g., the server 106, or the electronic device 102 or 104). According to an embodiment of the present disclosure, the applications 370 may include a preloaded application or a third party application which can be downloaded from the server. Names of the elements of the program module 300, according to the above-described embodiments of the present disclosure, may change depending on the type of OS.

Before a detailed description about this disclosure, the term used herein will be now defined.

Hereinafter, sensor-related data collected according to a user activity will be classified into raw data, primary processed data, and secondary processed data. Raw data may refer to data measured from at least one sensor contained in the sensor module 240. For example, data measured from the acceleration sensor 240E of the sensor module 240 may be acceleration values a specific object on the x-, y-, and z-axes. Namely, acceleration values on the x-, y-, and z-axes may be considered as raw data.

Primary processed data may be data obtained by processing raw data. For example, an acceleration value of a specific object may be obtained by calculating acceleration values on the x-, y-, and z-axes measured from the acceleration sensor 240E, and this may be referred to as primary processed data. Primary processed data may have enough data for a one-time measurement, including data associated with a fingerprint, a skin color, a body temperature, and the like. In one embodiment, a coordinate value measured from a GPS sensor is enough data for a one-time measurement and thus may be considered as primary processed data.

Secondary processed data may be data reinterpreted using at least one primary processed data. For example, exercise status information of a user may be obtained by the calculation of a pulse rate and an acceleration value. A pulse rate may be primary processed data measured and processed from an electrocardiography (ECG) sensor which is one of biometric sensors. An acceleration value may be primary processed data measured and processed from an acceleration sensor. That is, exercise status information of a user, which is secondary processed data, may be obtained by calculating primary processed data of an ECC sensor and primary processed data of an acceleration sensor. Further, secondary processed data may include data being meaningful as statistical values (e.g., a mean value, a maximum value, a minimum value, a mode value, etc.) and data which arises meaning when measured more than a given time or cycle. In one embodiment in which a coordinate value measured from a GPA sensor is considered as first processed data, such data is measured and accumulated at regular intervals to create a travel path, which may be considered as secondary processed data.

Now, an electronic device and a data display method thereof according to various embodiments of the present disclosure will be described in detail with reference to FIGS. 4 to 10.

Figure 4:
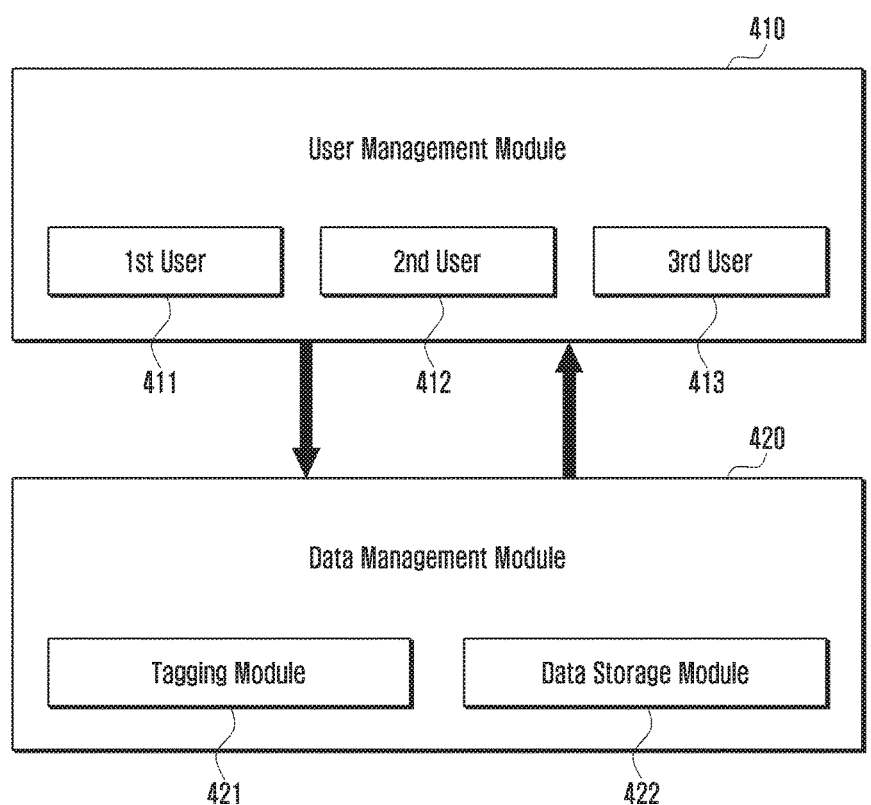
FIG. 4 is a block diagram illustrating a configuration of an electronic device for providing data in a multi-user environment according to various embodiments of the present disclosure.

FIG. 4 is a block diagram illustrating a configuration of an electronic device for providing data according to various embodiments of the present disclosure. FIG. 4 shows a user management module 410 and a data management module 420. The processor 120 of the electronic device 101 as shown in FIG. 1 or the AP 210 of the electronic device 201 as shown in FIG. 2 may include at least one of the user management module 410 and the data management module 420.

Referring to FIG. 4, the user management module 410 may manage user information and unique identifiers associated with such user information. As shown in FIG. 4, the user management module 410 may separately manage respective users such as a first user 411, a second user 412 and a third user 413.

The user management module 410 may receive an input of user information from a user. The user management module 410 may create an identifier by using at least one of user information inputs or receiving an input of a separate identifier from a user. The created identifier may be stored in association with user information.

The user information may be biometric information, to be used for login, including ID, password, fingerprint, iris, skin conductivity, voice, face, and the like.

Also, in case the electronic device 201 is communicating with an external electronic device (e.g., the electronic device 102 or 104), the user information may include unique information of the external electronic device or an identifier associated with the external electronic device, which may be used as an identifier of the electronic device 201.

For example, if the electronic device 201 used by a plurality of users is a watch which is one of wearable devices, a smart phone which is an external device paired with the watch may be a personalized device of one user among users using the watch. Therefore, user information registered in the watch may include unique information (e.g., media access control address (MAC address), device name, etc.) of the smart phone, and the watch may create, as an identifier, one of unique information of the smart phone.

When a user logs in, the user management module 410 may recognize information about a user who logs in to the electronic device 201, determine a user based on the recognized user information, and identify an identifier stored in association with the user information. Additionally, after identifying the identifier, the user management module 410 may send the identified identifier to the data management module 420 so as to notify a login identifier to the data management module 420.

The data management module 420 may include a tagging module 421 and a data storage module 422. The tagging module 421 of the data management module 420 may tag an identifier, received from the data management module 410, with sensor-related data acquired from at least one sensor and then store the identifier-tagged sensor-related data in the data storage module 422.

In one embodiment, if it is recognized that a specific user logs in to the electronic device 201, the tagging module 421 may tag data, measured from a sensor for measuring ECG, and an identifier of the login user, received from the user management module 410, and then store the identifier-tagged data in the data storage module 422. A sensor-related data with which an identifier is tagged by the data tagging module 421 may be at least one of raw data, a first processed data, and a second processed data.

In another embodiment, the tagging module 421 of the data management module 420 may tag an identifier, received from the user management module 410, with data, created by a user, and then store the identifier-tagged data in the data storage module 422. The data created by a user may be text, image, etc. created by a user.

In case a plurality of users use the electronic device 201, the data storage module 422 of the data management module 420 may store at least one sensor-related data having a tagged identifier of each login user or store identifier-tagged data created by at least one user.

According to various embodiments of the present disclosure, a user may determine whether to activate a tagging function of at least one of applications that utilize at least one sensor data. To deactivate a tagging function may mean that the user management module 410 and the data storage module 422 do not perform related operations.

An application with an activated tagging function may request the data storage module 422, which stores identifier-tagged data, to provide data regarding an identifier corresponding to a user logging in to the electronic device 201. In response to this request, the data storage module 422 may tag an identifier, corresponding to a login user, with at least part of data acquired from at least one sensor, store the identifier-tagged data, and then send the tagged data to the application with an activated tagging function. The application with an activated tagging function may acquire the data and then display the acquired data to a user.

In an embodiment, if the electronic device 201 recognizes a user's action to activate the tagging function with regard to a pedometer application, the pedometer application may request the data storage module 422 to provide data about an identifier corresponding to a login user so as to display only data about the identifier corresponding to the login user when displaying pedometer-related data. The data management module 420 may tag the identifier of the login user with at least part of pedometer data obtained through a sensor for measuring pedometer and then store the identifier-tagged data. The data management module 420 may transmit the identifier-tagged data to the pedometer application, which may acquire and display the data associated with the identifier corresponding to the login user.

An application with a tagging function inactivated may display data acquired from one or more sensors without discrimination of identifiers. Namely, an application with an inactivated tagging function may display any data of other users as well as data associated with a user using the electronic device 201.

In an embodiment, if the electronic device 201 recognizes a user's action to inactivate the tagging function with regard to an ECG-related application, the ECG-related application may display ECG-related sensor data without discrimination of identifiers.

According to various embodiments of the present disclosure, an application may display newly acquired sensor-related data separately or display newly acquired sensor-related data added to previously acquired sensor-related data. Additionally, an application may apply newly acquired sensor-related data to previously acquired sensor-related data and then display resultant data.

According to various embodiments of the present disclosure, an electronic device may include a sensor unit configured to obtain data associated with user's activity through at least one sensor, a memory, and a processor electrically connected to the memory. In this electronic device, the processor may be configured to receive an input, to identify an identifier of at least one user corresponding to the received input from among registered users, to acquire data associated with the identifier through the at least one sensor functionally connected to the electronic device, and to store the identifier as at least part of the acquired data.

According to various embodiments of the present disclosure, the processor may be further configured to transmit the stored data to at least one application associated with the identifier, to compare an identifier stored as at least part of the stored data with an identifier of at least one user corresponding to the input by controlling the at least one application, and to, among the stored data, display data in which the identifier of at least one user corresponding to the input is stored as at least part.

According to various embodiments of the present disclosure, the processor may be further configured to store user information about the two or more users in the electronic device.

According to various embodiments of the present disclosure, the user information may be information unique to each user, including biometric information.

According to various embodiments of the present disclosure, the identifier may be the user information itself, is created when the user information is stored, is entered as a character string by the user, or is unique information of an external electronic device which is pairing or communicating with the electronic device.

According to various embodiments of the present disclosure, the processor may be further configured to ignore data acquired through the at least one sensor if the input fails to correspond to at least one of the two or more users.

According to various embodiments of the present disclosure, the acquired data may include at least one of raw data measured from the at least one sensor, primary processed data obtained by interpreting the raw data, and secondary processed data obtained by reinterpreting the primary processed data.

According to various embodiments of the present disclosure, the processor may be further configured to recognize execution of at least one application, and to acquire data from a sensor associated with the at least one application among the at least one sensor.

According to various embodiments of the present disclosure, the processor may be further configured to store a user change time if the input is changed and if a user corresponding to the input is changed, to compare the user change time with a data acquisition time of the acquired data, and if the user change time is earlier than the data acquisition time, to identify an identifier of the changed user and storing the identifier as at least part of the acquired data.

According to various embodiments of the present disclosure, the processor may be further configured to store information about a previous user and a next user between the acquired data arranged on a time axis whenever the user corresponding to the input is changed.

According to various embodiments of the present disclosure, the processor may be further configured to store the identifier to at least part of front and rear parts of the acquired data.

According to various embodiments of the present disclosure, the processor may be further configured to divide the acquired data according to a particular criterion among a data measured time, a data size, and a data type, and to store the identifier to the divided data.

According to various embodiments of the present disclosure, the processor may be further configured to calculate statistical data by using at least part of the acquired data if an acquired time of the acquired data meets a specific condition, and to store the identifier as at least part of the statistical data.

According to various embodiments of the present disclosure, the application may include an application in which a function for storing an identifier as at least part of data is activated.

According to various embodiments of the present disclosure, a computer-readable storage medium may record thereon a program for executing a data provision method of an electronic device, wherein the method may include operations of receiving an input, identifying an identifier of at least one user corresponding to the received input from among registered users, acquiring data associated with the identifier through at least one sensor functionally connected to the electronic device, and storing the identifier as at least part of the acquired data.

Figure 5:
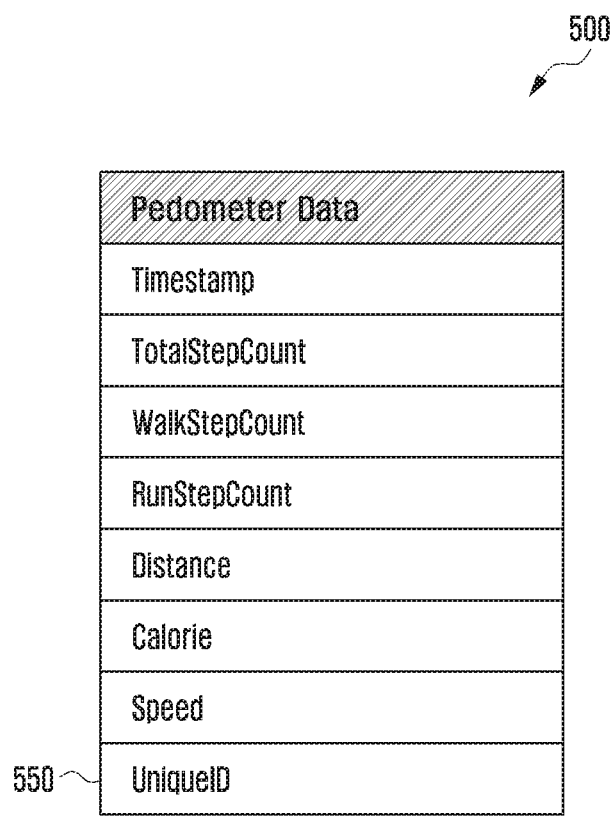
FIG. 5 is a diagram illustrating an example of stored data according to various embodiments of the present disclosure.

FIG. 5 is a diagram illustrating an example of stored data according to various embodiments of the present disclosure.

Referring to FIG. 5, shown is pedometer data 500, as an example of sensor-related data, which is stored in the form of being tagged with an identifier 550 (also referred to as a unique ID). The pedometer data 500 may be secondary processed data including a time stamp, a total step count, a walk step count, a run step count, a distance, a calorie, and a speed. Like the pedometer data shown in FIG. 5, the electronic device 201, especially the tagging module 421, may tag the identifier 550 with the sensor-related data 500.

In one embodiment, the tagging module 421 may tag the identifier to the front and/or rear part of each of raw data, primary processed data, and secondary data.

In another embodiment, whenever a user logging in to the electronic device 201 is changed, namely whenever an identifier corresponding to a login user is changed, the tagging module 421 may tag at least one of a changed time and changed identifier information. Specifically, for example, the tagging module 421 may tag at least one of the changed time and the changed identifier information to a particular time point corresponding to the changed time between respective data measured from a sensor and arranged in the order of time. For example, the changed identifier information may include any information for indicating a change from an identifier 'ID_1' to an identifier 'ID_2'.

In still another embodiment, the tagging module 421 may divide data, measured from a sensor, according to a particular criterion and then tag an identifier with each divided data. For example, the particular criterion may include a data measured time, a data size, a data type, and the like.

In still another embodiment, after subdividing relatively recent data among data measured from a sensor and also calculating statistical values of the other data, the tagging module 421 may tag an identifier with the subdivided data and the calculated values of data.

In still another embodiment, if the acquired time of acquired data meets a specific condition, the tagging module 421 may calculate statistical data by using at least part of the acquired data and then store the identifier with at least part of the statistical data.

Figure 6:
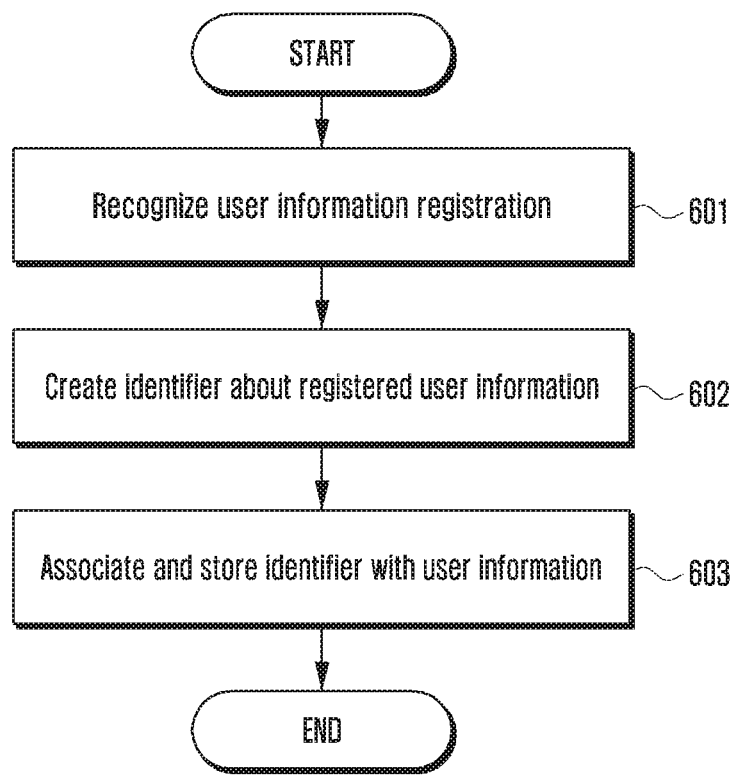
FIG. 6 is a flow diagram illustrating a process of registering a user and creating an identifier according to various embodiments of the present disclosure.

FIG. 6 is a flow diagram illustrating a process of registering a user and creating an identifier according to various embodiments of the present disclosure.

Referring to FIG. 6, at operation 601, the electronic device 201 (e.g., the user management module 410) may recognize registration of user information by a user. In one embodiment, the electronic device 201 (e.g., the user management module 410) may receive user information from a user. For example, the electronic device 201 may receive an input of user information through a keypad from a user. In case of paring or communication between the electronic device 201 and a certain external electronic device, the electronic device 201 may receive, as user information, unique information of the external electronic device. Further, the electronic device 210 may receive biometric information, as user information, through a sensor capable of acquiring user's biometric information.

At operation 602, the electronic device 201 (e.g., the user management module 410) may create an identifier regarding the registered user information. In one embodiment, the electronic device 201 (e.g., the user management module 410) may automatically create an identifier according as user information is registered.

In another embodiment, if a user enters a character string as an identifier, the electronic device 201 (e.g., the user management module 410) may create the character string as an identifier. When any identifier is entered for user registration, the electronic device 201 (e.g., the user management module 410) may check whether the entered identifier is duplicated with previously registered identifiers, and if duplicated, the electronic device 201 may display a notice that requests another identifier.

In still another embodiment, in case iris biometric information is registered as user information, the electronic device 201 (e.g., the user management module 410) may use the recognized iris information itself as an identifier without any additional identifier. The electronic device 201 (e.g., the user management module 410) may store the iris information, which is an identifier, in association with the registered user information.

In still another embodiment, in case of paring or communication between the electronic device 201 and a certain external electronic device, an identifier or any other unique information of the external electronic device may be used as an identifier of the electronic device 201.

At operation 603, the electronic device 201 (e.g., the user management module 420) may associate and store the created identifier with the registered user information. In one embodiment, an identifier may be automatically created when the user information is registered, and the electronic device 201 (e.g., the user management module 410) may associate and store the automatically created identifier with the registered user information.

In another embodiment, if the electronic device 201 uses, as an identifier, unique information of any external device being pairing or communicating therewith or an identifier associated with the external electronic device, the electronic device 201 (e.g., the user management module 420) may associate and store the registered user information with the unique information of the external electronic device or with the identifier associated with the external electronic device.

Figure 7:
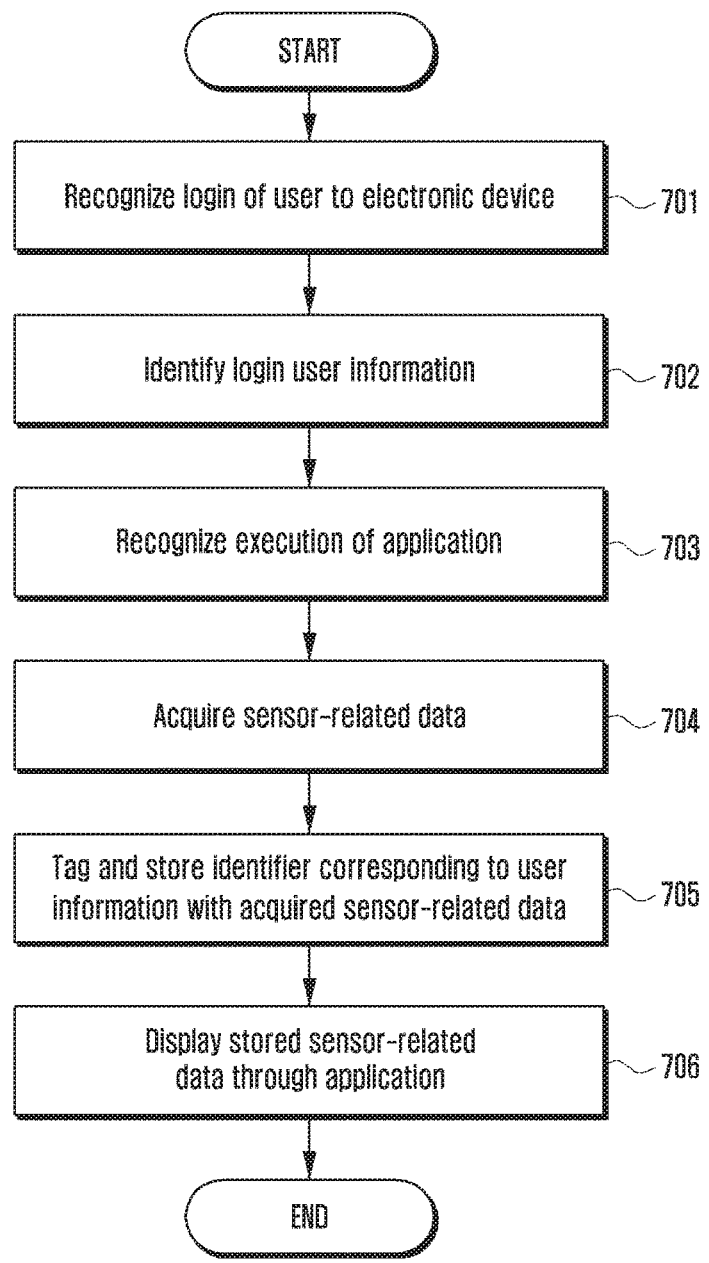
FIG. 7 is a flow diagram illustrating operations of an electronic device according to an embodiment of the present disclosure.

FIG. 7 is a flow diagram illustrating operations of an electronic device according to an embodiment of the present disclosure.

Referring to FIG. 7, at operation 701, the electronic device 210 (e.g., the user management module 410) may recognize a user login to the electronic device 201. In one embodiment, a user may log in to the electronic device 201 by using preregistered user information.

At operation 702, the electronic device 201 (e.g., the user management module 410) may identify an identifier of a login user. In one embodiment, the electronic device 201 (e.g., the user management module 410) may identify user information of a user using the electronic device 201 without any input from a user. For example, a walk pattern of a first user who has used the electronic device 201 may be stored as user information of the first user. If any data having similar patterns is repeatedly entered and stored for a certain period, the electronic device 201 (e.g., the user management module 420) may store such data as user information corresponding to a user of the identifier tagged with the data. Namely, when the first user merely walks while carrying the electronic device 201 without additional login, the electronic device 210 may recognize that the first user logs in.

At operation 703, the electronic device 201 (e.g., the user management module 410) may recognize the execution of an application. In one embodiment, the electronic device 201 (e.g., the user management module 410) may recognize that a user triggers a pedometer application for displaying a walk step count.

At operation 704, the electronic device 201 (e.g., the user management module 420) may acquire sensor-related data. According to various embodiments of the present disclosure, after login user information is identified, the electronic device 201 (e.g., the user management module 410) may acquire sensor-related data from at least one sensor.

At operation 705, the electronic device 201 (e.g., the user management module 420) may tag the acquired sensor-related data with an identifier and then store the identifier-tagged sensor-related data. For example, when pedometer data is acquired from the pedometer sensor, the electronic device 201 (e.g., the user management module 420) may tag an identifier with the acquired pedometer data and then store the identifier-tagged data.

At operation 706, the electronic device 201 (e.g., the user management module 410) may display the stored data so that a user can see the stored data through an application. For example, the electronic device 201 may display pedometer data through the pedometer application for a log in user corresponding to the identifier. In one embodiment, the electronic device 201 (e.g., the user management module 410) may recognize the execution of a location-based application for displaying travel path information. Namely, the electronic device 201 (e.g., the user management module 420) may acquire the travel path information, i.e., secondary processed information, from the GPS sensor, tag an identifier with the acquired data, and then store the identifier-tagged data. Also, the electronic device 201 may display the stored data through the location-based application. The location-based application may display data regarding a login user only and also display the tagged data for respective users. For example, the location-based application may display a frequently visited place or recently visited place for each user.

In another embodiment, the electronic device 201 (e.g., the user management module 410) may recognize a login of a second user. Further, the electronic device 201 (e.g., the user management module 410) may also recognize a login of a third user. The electronic device 201 may recognize an application executed by one of the first and second users and, from a sensor, acquire data associated with the executed application. The electronic device 201 (e.g., the user management module 420) may tag both a first user identifier and a second user identifier with the acquired data and then store the identifier-tagged data. The executed application may use the sensor-related data when displayed for the first user or the second user.

For example, when the first user using a fingerprint as an identifier and the second user using an iris as an identifier walk together, respective users may log in to the electronic device 210 by using their identifiers and then execute a map application so as to acquire travel path information. Then the electronic device 201 (e.g., the user management module 420) may tag both login identifiers, together or separately, with the travel path information acquired through the GPS sensor and store the tagged data. In case identifiers of both users are tagged together with the travel path information, the executed map application may identify the travel path information, which is the sensor-related data tagged together with identifiers of both users, and then display the identified travel path information. Alternatively, in case identifiers of both users are tagged separately with the travel path information and stored, the executed map application may identify the sensor-related data tagged separately with an identifier of each user and then display the sensor-related data for each identifier.

Figure 8:
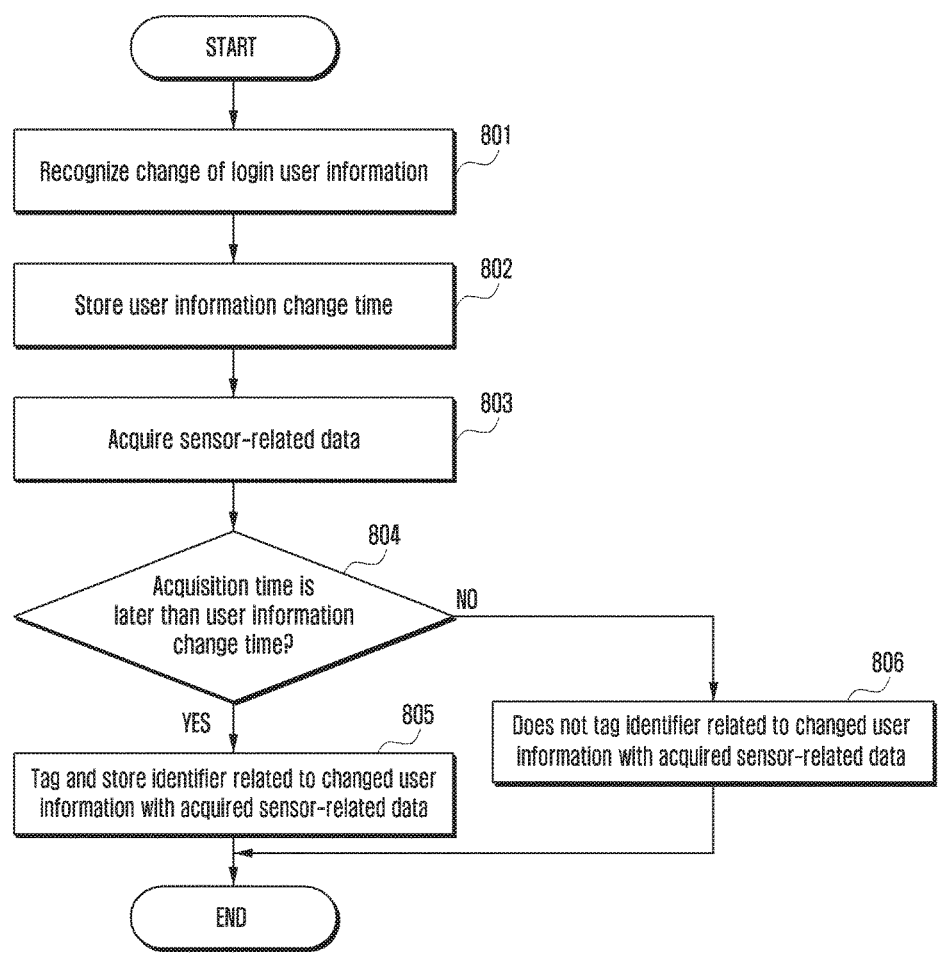
FIG. 8 is a flow diagram illustrating operations of an electronic device according to another embodiment of the present disclosure.

FIG. 8 is a flow diagram illustrating operations of an electronic device according to another embodiment of the present disclosure.

Specifically, FIG. 8 shows a case where data measured from a sensor is not transmitted immediately on collection from the sensor.

Referring to FIG. 8, at operation 801, the electronic device 201 (e.g., the user management module 410) may recognize that user information about a user using the electronic device 201 is changed. Namely, the electronic device 201 (e.g., the user management module 410) may recognize a change of user information corresponding to a login user and also recognize a change of an identifier associated with user information. At operation 802, the electronic device 201 may store a user information change time. In one embodiment, the electronic device 201 may store the user information change time by using a log and also inquire a stored time.

In another embodiment, the electronic device 201 (e.g., the tagging module 421) may tag the change time with an identifier corresponding to changed user information. In still another embodiment, the electronic device 201 may be provided with a user login time through the API without storing such user information change time.

At operation 803, the electronic device 201 may acquire sensor-related data from at least one sensor. At operation 804, the electronic device 201 (e.g., the user management module 410) may determine whether a time of acquiring the sensor-related data is later than the user information change time. If it is determined at operation 804 that the sensor-related data acquisition time is later than the user information change time, the electronic device 201 (e.g., the data management module 420) may tag, at operation 805, an identifier associated with changed user information with the acquired sensor-related data and then store the identifier-tagged data. In one embodiment, if user information is changed automatically according to a change of time or date in a sleep mode, the electronic device 201 (e.g., the data management module 420) may tag an identifier, associated with the changed user information, with only the sensor-related data after the change of user information, and then store the identifier-tagged data. If it is determined at operation 804 that the sensor-related data acquisition time is earlier than the user information change time, the electronic device 201 (e.g., the data management module 420) may not tag, at operation 806, an identifier associated with changed user information with the acquired sensor-related data.

In one embodiment, the electronic device 201 (e.g., the user management module 410) may recognize that a login user is changed from a user logging in with iris user information to other user having no user information or logging in with nonregistered user information. In this case, the electronic device 201 (e.g., the data management module 420) may not store any sensor-related data measured after such a change.

According to various embodiments of the present disclosure, if the electronic device 201 (e.g., the user management module 410) determines that the sensor-related data acquisition time is earlier than the identifier change time, the electronic device 201 (e.g., the data management module 420) may tag an identifier before the change with the acquired sensor-related data and then store the identifier-tagged data.

According to various embodiments of the present disclosure, the electronic device 201 (e.g., the user management module 410) may recognize a change of a user using the electronic device 201. A user having no identifier or any nonregistered identifier may be a guest, which may include a login in a guest mode or a login with user information temporarily given to a guest.

Figure 9:
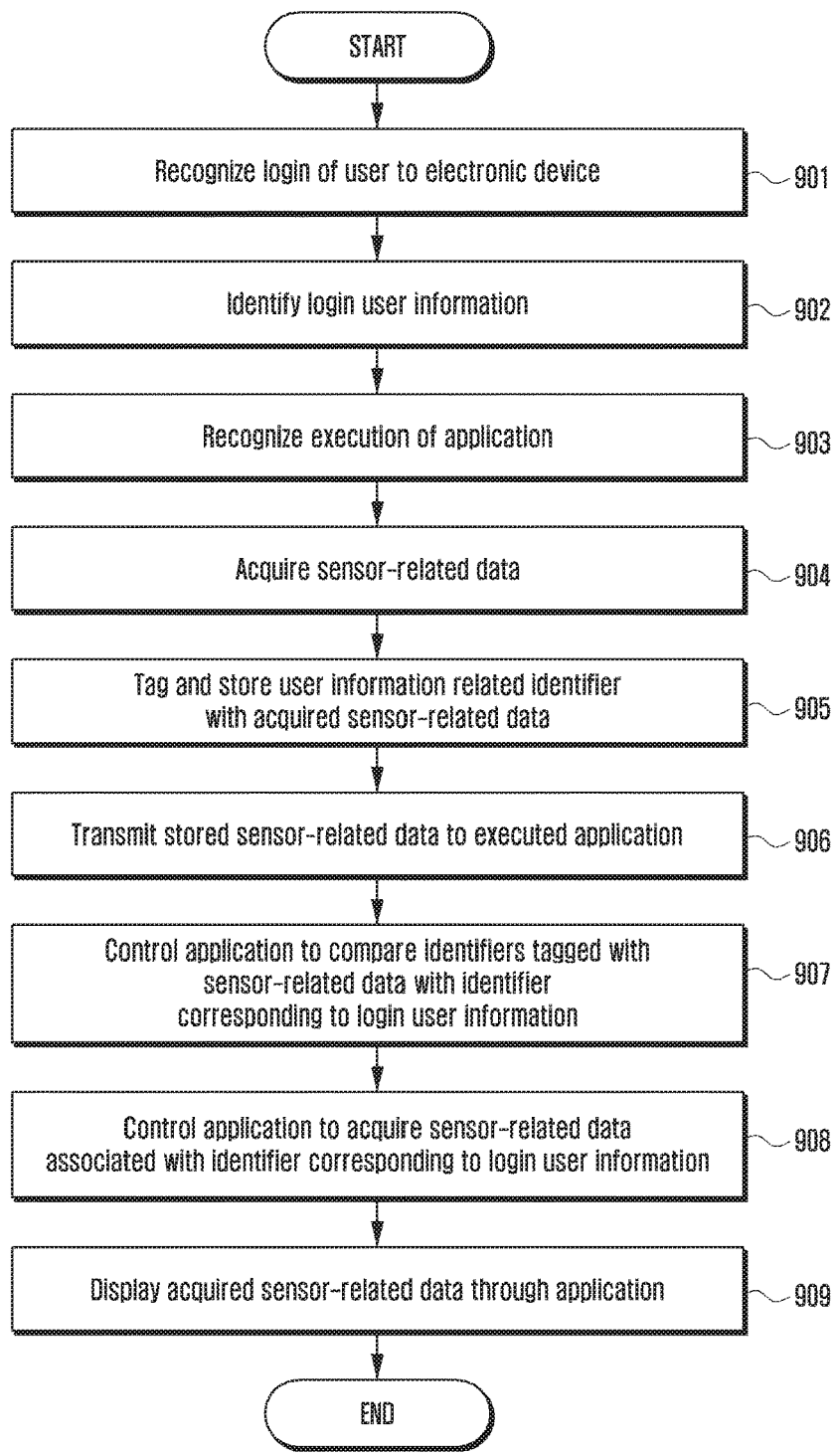
FIG. 9 is a flow diagram illustrating operations of an electronic device according to still another embodiment of the present disclosure.

FIG. 9 is a flow diagram illustrating operations of an electronic device according to still another embodiment of the present disclosure.

Referring to FIG. 9, at operation 901, the electronic device 201 (e.g., the user management module 410) may recognize that a user logs in to the electronic device 201. At operation 902, the electronic device 201 (e.g., the user management module 410) may identify an identifier of the login user. At operation 903, the electronic device 201 may recognize the execution of an application. At operation 904, the electronic device 201 may acquire sensor-related data.

At operation 905, the electronic device 201 (e.g., the data management module 420) may tag an identifier with the acquired sensor-related data and then store the identifier-tagged data.

At operation 906, the electronic device 201 (e.g., the data management module 420) may transmit the stored sensor-related data to the executed application. Each of the data stored in the data storage module 422 is sensor-related data and may have an identifier tagged therewith.

At operation 907, the electronic device 201 may control the application to compare the identifiers, tagged with the stored sensor-related data, with ID of the login user. At operation 908, the electronic device 201 may control the application to acquire the sensor-related data having a tagged identifier which is equal to an identifier corresponding to the login user. At operation 909, the electronic device 201 may display the acquired sensor-related data through the application.

For example, if the login identifier is an iris, the executed application may identify respective identifiers tagged with the sensor-related data and thereby determine whether there is any sensor-related data having a tagged identifier being equal to the iris. If a sensor-related data having a tagged identifier being equal to the iris is found, the application may display the found sensor-related data.

Figure 10:
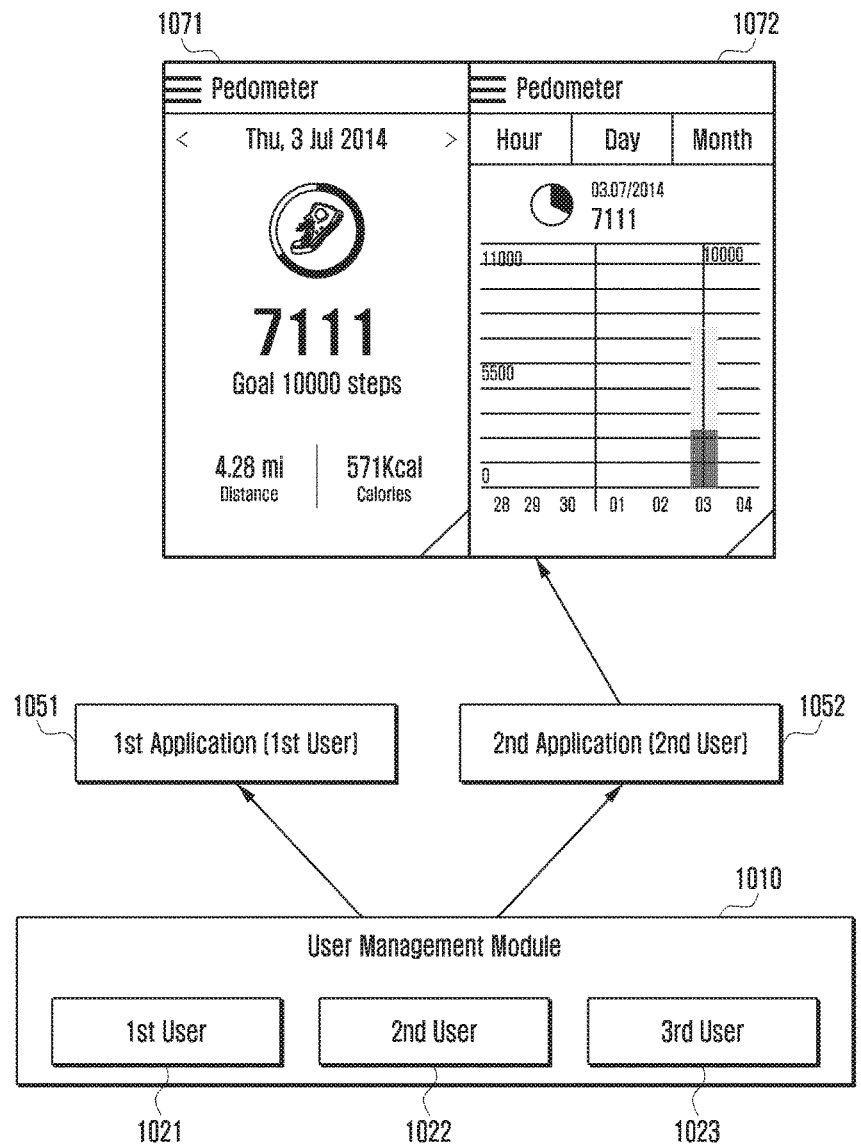
FIG. 10 is a diagram illustrating an example of operations of an electronic device according to various embodiments of the present disclosure.

FIG. 10 is a diagram illustrating an example of operations of an electronic device according to various embodiments of the present disclosure.

Referring to FIG. 10, the user management module 1010 may store user information and identifiers about several users, for example, a first user 1021, a second user 1022, and a third user 1023. The user management module 1010 may transmit an identifier of a current login user to both a first application 1051 and a second application 1052. In FIG. 10, let's suppose that a first application 1051 is associated with a first user and that a second application 1052 is associated with a second user. For example, a first application may be an ECG measurement application, and a second application may be a pedometer application.

In case of being associated with an identifier corresponding to the current login user, each of the first application 1051 and the second application 1052 may display sensor-related data having a tagged identifier being equal to the identifier of the current login user among at least one sensor-related data stored in the data storage module (422 even though not shown in FIG. 10) of the data management module. Referring to FIG. 10, an identifier corresponding to the current login user may be an identifier of the second user, and the second application 1052 may be associated with the identifier of the second user. Therefore, the second application 1052 may display only the sensor-related data tagged with the same identifier as an identifier of the second user among sensor-related data stored in the data storage module. Reference numerals 1071 and 1072 denote examples of sensor-related data tagged with the second user identifier and displayed through the second application 1052 on the electronic device 201.

As indicated by a reference numeral 1071, the second application 1052 may display a one-day walk step count, by means of numerical and/or graphical information, of a user using the electronic device 201. Further, as indicated by a reference numeral 1072, the second application 1052 may display a daily, weekly, or monthly walk step count together with other information.

According to various embodiments of the present disclosure, a method may be implemented by an electronic device in which two or more users are registered. The method may include operations of receiving an input, identifying an identifier of at least one user corresponding to the received input from among the registered users, acquiring data associated with the identifier through at least one sensor functionally connected to the electronic device, and storing the identifier as at least part of the acquired data.

According to various embodiments of the present disclosure, the method may further include operations of transmitting the stored data to at least one application associated with the identifier, comparing an identifier stored as at least part of the stored data with an identifier of at least one user corresponding to the input by controlling the at least one application, and among the stored data, displaying data in which the identifier of at least one user corresponding to the input is stored as at least part.

According to various embodiments of the present disclosure, the method may further include an operation of storing user information about the two or more users in the electronic device.

According to various embodiments of the present disclosure, the user information may be information unique to each user, including biometric information.

According to various embodiments of the present disclosure, the identifier may be the user information itself, is created when the user information is stored, is entered as a character string by the user, or is unique information of an external electronic device which is pairing or communicating with the electronic device.

According to various embodiments of the present disclosure, the acquiring operation may include an operation of ignoring data acquired through the at least one sensor if the input fails to correspond to at least one of the two or more users.

According to various embodiments of the present disclosure, the acquired data may include at least one of raw data measured from the at least one sensor, primary processed data obtained by interpreting the raw data, and secondary processed data obtained by reinterpreting the primary processed data.

According to various embodiments of the present disclosure, the acquiring operation may include operations of recognizing execution of at least one application, and acquiring data from a sensor associated with the at least one application among the at least one sensor.

According to various embodiments of the present disclosure, the storing operation may include operations of storing a user change time if the input is changed and if a user corresponding to the input is changed, comparing the user change time with a data acquisition time of the acquired data, and if the user change time is earlier than the data acquisition time, identifying an identifier of the changed user and storing the identifier as at least part of the acquired data.

According to various embodiments of the present disclosure, the operation of storing the identifier as at least part of the acquired data may include an operation of storing information about a previous user and a next user between the acquired data arranged on a time axis whenever the user corresponding to the input is changed.

According to various embodiments of the present disclosure, the storing operation may include an operation of storing the identifier to at least part of front and rear parts of the acquired data.

According to various embodiments of the present disclosure, the storing operation may include operations of dividing the acquired data according to a particular criterion among a data measured time, a data size, and a data type, and storing the identifier to the divided data.

According to various embodiments of the present disclosure, the storing operation may include operations of calculating statistical data by using at least part of the acquired data if an acquired time of the acquired data meets a specific condition, and storing the identifier as at least part of the statistical data.

According to various embodiments of the present disclosure, the application may include an application in which a function for storing an identifier as at least part of data is activated.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of an electronic device in which two or more users are registered, the method comprising:
  receiving an input;
  storing a user change time if the input is changed and if a user corresponding to the input is changed;
  identifying at least one identifier of the user corresponding to the input and identifier of the changed user corresponding to the changed input, from among the two or more registered users;
  acquiring data associated with the at least one identifier through at least one sensor functionally connected to the electronic device;
  comparing the user change time with a data acquisition time of the acquired data;
  if the user change time is later than the data acquisition time, storing the identifier of the user corresponding to the input as at least part of the acquired data; and
  if the user change time is earlier than the data acquisition time, storing the identifier of the changed user corresponding to the changed input as at least part of the acquired data.

2. The method of claim 1, further comprising:
  transmitting the data to at least one application associated with the at least one identifier;
  comparing an identifier stored as at least part of the data with the identifier of the changed user corresponding to the changed input; and
  displaying data in which the identifier of the changed user corresponding to the changed input is stored.

3. The method of claim 1, further comprising:
  storing user information about the two or more registered users in the electronic device,
  wherein the user information comprises information, including biometric information, which is unique to each user.

4. The method of claim 3,
  wherein the identifier comprises the user information, and
  wherein the identifier is created when the user information is stored, is entered as a character string by the user, or is unique information of an external electronic device which is pairing or communicating with the electronic device.

5. The method of claim 1, wherein the acquiring of the data associated with the identifier includes ignoring data acquired through the at least one sensor if the input fails to correspond to at least one of the two or more registered users.

6. The method of claim 1, wherein the acquired data includes at least one of:
  raw data measured from the at least one sensor;
  primary processed data obtained by interpreting the raw data; or
  secondary processed data obtained by reinterpreting the primary processed data.

7. The method of claim 1, wherein the storing of the identifier further includes storing information about a previous user and a next user between the acquired data arranged on a time axis, when the user corresponding to the input is changed.

8. The method of claim 1, wherein the storing of the identifier includes:
dividing the acquired data according to a particular criterion among a data measured time, a data size, and a data type; and
storing the identifier to the divided data.

9. The method of claim 1, wherein the storing of the identifier includes:
calculating statistical data, by using at least part of the acquired data, if an acquired time of the acquired data meets a specific condition; and
storing the identifier as at least part of the statistical data.

10. An electronic device comprising:
a sensor unit comprising at least one sensor and configured to obtain data associated with a user's activity through the at least one sensor;
a memory; and
a processor electrically connected to the memory,
wherein the processor is configured to:
receive an input,
store a user change time if the input is changed and if a user corresponding to the input is changed,
identify at least one identifier of the user corresponding to the input and identifier of the changed user corresponding to the changed input, from among two or more registered users,
acquire data associated with the at least one identifier through the at least one sensor functionally connected to the electronic device,
compare the user change time with a data acquisition time of the acquired data,
if the user change time is later than the data acquisition time, store the identifier of the user corresponding to the input as at least part of the acquired data, and
if the user change time is earlier than the data acquisition time, store the identifier of the changed user corresponding to the changed input as at least part of the acquired data.

11. The electronic device of claim 10, wherein the processor is further configured to:
transmit the data to at least one application associated with the at least one identifier,
compare an identifier stored as at least part of the data with an identifier of the changed user corresponding to the changed input by controlling the at least one application, and
display data in which the identifier of the changed user corresponding to the changed input is stored.

12. The electronic device of claim 10,
wherein the processor is further configured to store user information about the two or more registered users in the electronic device, and
wherein the user information comprises information, including biometric information, which is unique to each user.

13. The electronic device of claim 12,
wherein the identifier comprises the user information, and
wherein the identifier is created when the user information is stored, is entered as a character string by the user, or is unique information of an external electronic device which is pairing or communicating with the electronic device.

14. The electronic device of claim 10, wherein the acquired data includes at least one of:
raw data measured from the at least one sensor;
primary processed data obtained by interpreting the raw data; or
secondary processed data obtained by reinterpreting the primary processed data.

15. The electronic device of claim 10, wherein the processor is further configured to store information about a previous user and a next user between the acquired data arranged on a time axis, when the user corresponding to the input is changed.

16. The electronic device of claim 10, wherein the processor is further configured to:
calculate statistical data by using at least part of the acquired data if an acquired time of the acquired data meets a specific condition, and
store the identifier as at least part of the statistical data.

17. A non-transitory computer-readable storage medium having recorded thereon instructions comprising a program for executing a method of an electronic device in which two or more users are registered, the method comprising:
receiving an input;
storing a user change time if the input is changed and if a user corresponding to the input is changed;
identifying at least one identifier of the user corresponding to the input and identifier of the changed user corresponding to the changed input, from among the two or more registered users;
acquiring data associated with the at least one identifier through at least one sensor functionally connected to the electronic device;
comparing the user change time with a data acquisition time of the acquired data;
if the user change time is later than the data acquisition time, storing the identifier of the user corresponding to the input as at least part of the acquired data; and
if the user change time is earlier than the data acquisition time, storing the identifier of the changed user corresponding to the changed input as at least part of the acquired data.

* * * * *